United States Patent [19]

Mein

[11] 4,447,406
[45] May 8, 1984

[54] PROCESS FOR RECOVERING CESIUM FROM CESIUM ORE

[75] Inventor: Peter G. Mein, LaSalle, Ill.

[73] Assignee: Carus Corporation, LaSalle, Ill.

[21] Appl. No.: 512,924

[22] Filed: Jul. 12, 1983

[51] Int. Cl.$^3$ .............................................. C01G 45/12
[52] U.S. Cl. .................................. 423/198; 423/179; 423/184; 423/421; 423/599
[58] Field of Search ............... 423/599, 600, 499, 179, 423/184, 421, 199, 198

[56] References Cited

U.S. PATENT DOCUMENTS

| | | | |
|---|---|---|---|
| 956,120 | 4/1910 | Machalske | 423/599 |
| 1,281,085 | 10/1918 | Shoeld | 423/599 |
| 2,481,455 | 9/1949 | Stenger | 423/499 |
| 2,504,130 | 4/1950 | Jaskowiak | 423/599 |
| 2,808,313 | 10/1957 | Fleischmann | 423/499 |
| 2,940,822 | 6/1960 | Carus et al. | 423/599 |
| 3,112,169 | 11/1963 | Berthold et al. | 423/117 |
| 3,207,571 | 9/1965 | Berthold | 423/600 |
| 3,489,509 | 1/1970 | Johnson | 423/499 |

FOREIGN PATENT DOCUMENTS

| | | | |
|---|---|---|---|
| 1323932 | 3/1963 | France | 423/499 |
| 128454 | 4/1959 | U.S.S.R. | 423/421 |
| 504704 | 5/1976 | U.S.S.R. | 423/421 |

OTHER PUBLICATIONS

J. J. Kennedy, *Chemical Reviews*, vol. 23 (1938), pp. 157–163.

Kirk-Othmer, *Encylopedia of Chemical Techology*, vol. 5, Third Edition (1979), pp. 327–338.

Vydrik et al., *Inorg. Mater.* (U.S.A.), vol. 8, No. 2 (Feb. 1972), pp. 366, 367.

*Primary Examiner*—Gary P. Straub
*Assistant Examiner*—Wayne A. Langel

[57] ABSTRACT

Cesium is recovered from a cesium-bearing mineral such as pollucite by extraction with hydrochloric acid to obtain an extract of cesium chloride and other alkali metal and polyvalent metal chlorides. The iron and aluminum chlorides can be precipitated as the hydroxides and separated from the solution of the alkali metal chlorides to which is added potassium permanganate or other water-soluble permanganate to selectively precipitate cesium permanganate. The cesium precipitate is then separated from the residual solution containing the metal chlorides. The cesium permanganate, which is in a very pure form, can be converted to other cesium compounds by reaction with a reducing agent to obtain cesium carbonate and cesium delta manganese dioxide.

16 Claims, No Drawings

PROCESS FOR RECOVERING CESIUM FROM CESIUM ORE

BACKGROUND AND PRIOR ART

The field of this invention relates to the recovery of cesium from cesium-bearing minerals such as pollucite. More specifically, this invention relates to an improvement in such recovery processes wherein the cesium ore is extracted with a strong mineral acid to obtain an extract of the acid salts for further processing.

Processes for the recovery of cesium from pollucite and other cesium-containing minerals were reviewed by J. J. Kennedy in *Chemical Reviews*, Vol. 23 (1938), Pages 157–163. More recent technical developments were summarized by R. A. Heindl, *Bureau of Mines Bulletin* 650, "Mineral Facts and Problems" (1970 ed.), pages 527–534. In one process which has undergone considerable development for commercial use, ground pollucite ore is leached with strong sulfuric acid to obtain an extract containing cesium alum, which is recovered by crystallization for further processing. The cesium alum process has been considered a traditional process for recovering cesium from pollucite. However, other recovery processes have been proposed as described in the above citations. The first step of most such processes is an acid leaching of the pollucite to obtain cesium as a soluble salt in admixture with other metal salts. Such acid extraction occurs readily with a variety of strong acids, including not only sulfuric acid but also hydrobromic and hydrochloric acids.

Since pollucite ore contains substantial amounts of other alkali metals besides cesium such as rubidium, and potassium or sodium, as well as substantial amounts of polyvalent metals, primarily aluminum but also iron, acid leaching results in an extract containing the soluble cesium salt in admixture with other alkali metal and polyvalent metal salts. The efficient recovery of the cesium values from such extracts has therefore presented the art with a difficult problem, since it is desired to obtain the recovered cesium compound in as pure a form as possible for further processing to commercial cesium products, such as cesium chloride, cesium iodide, cesium carbonate, cesium sulfate, and also metallic cesium.

As already mentioned, where sulfuric acid is used for the digestion step, the cesium can be recovered as cesium alum, expressed as $CsAl(SO_4)_2.12H_2O$ or $Cs_2SO_4.Al_2(SO_4)_3.24H_2O$. Where hydrobromic acid is used, the aluminum bromide can be removed first by isopropyl alcohol extraction, and the mixed alkali metal bromides recovered and treated in an extractor to obtain a solution of cesium tribromide, which upon evaporation yields cesium bromide.

Where hydrochloric acid is the extractant, it has been proposed to selectively precipitate the cesium by addition of antimony chloride to form a precipitate of cesium antimony chloride ($CsSbCl_6$), which can be separated and decomposed in water to cesium chloride and a water-soluble compound of antimony. The cesium chloride can then be reacted with perchloric acid to produce crystals of cesium perchlorate, which can be recovered, and then decomposed to obtain cesium chloride as the final product. See U.S. Pat. No. 2,808,313 (1957).

While the above described processes are capable of producing cesium sulfate, cesium bromide, and cesium chloride in relatively high purity, these processes have proven to be difficult and expensive for commercial application. Therefore, there has been a recognized need for an improved process for recovering cesium from pollucite in a highly purified form. The need for such a process improvement has been emphasized in recent years by the increasing uses of cesium and cesium compounds, and by the projected expansion of these uses in anticipated applications. (See Heindl, above cited, pages 528–532.)

SUMMARY OF INVENTION

The improved process of this invention starts with the known step of leaching (extracting) a finely divided cesium-bearing mineral, such as pollucite, with aqueous hydrochloric acid to obtain an aqueous acidic extract containing in solution cesium chloride together with other alkali metal chlorides, such as rubidium, potassium and sodium chlorides, and polyvalent metal chloride including aluminum chloride and also usually iron chloride. Following the preparation of the acidic chloride extract, the process of this invention departs from any known prior art process or proposal.

The pH of the acid solution is raised to a pH of 3.0 or higher so that the solution has a pH at which permanganate is stable and can be used as a precipitating agent for the cesium. This pH adjustment may also be used to precipitate polyvalent metal hydroxide. This may be accomplished by adjusting the pH upwardly toward pH's at which the iron and aluminum hydroxides precipitate as hydrated hydroxides. In one embodiment, the pH is adjusted to a pH in the range of about 7.0 to 8.0 at which both the iron and aluminum can be removed as their hydroxide precipitates.

After separation of the precipitated polyvalent metal hydroxide, the residual aqueous solution will contain the cesium chloride together with other alkali metal chlorides. These will usually include substantial amounts of rubidium chloride, potassium chloride, and sodium chloride, the latter alkali metal usually being present in an increased amount due to the addition of sodium hydroxide for the pH adjustment referred to above. In connection with the development of the process of the present invention, it was discovered that the cesium could be selectively precipitated while leaving substantially all of the other alkali metal chlorides in solution by the addition of a water-soluble permanganate, such as potassium permanganate. The added permanganate ions selectively react with the cesium ions to form water-insoluble cesium permanganate, which precipitates, and can readily be removed from the residual solution of the other alkali metal chlorides and aluminum chloride. Permanganate does precipitate iron, so the iron, if present in more than trace amounts, is preferably removed as described above.

The resulting cesium permanganate, after separation by centrifugation or filtration and water-washing, has been found to be of a high degree of purity, being substantially free of other alkali metal or polyvalent metal compounds.

The cesium permanganate can be sold as a final product, or it can be further processed to obtain other commercially important cesium compounds. By reacting the cesium permanganate with a permanganate reducing agent, cesium carbonate ($Cs_2CO_3$) can be formed together with cesium delta manganese dioxide. In one procedure for carrying out this reduction, a slurry of the $CsMnO_4$ is formed in an aqueous alkaline solution containing the reducing agent, which conveniently may be a water-soluble organic compound such as methanol. The resulting cesium carbonate solution can be separated from the solid-phase cesium delta manganese dioxide. The cesium carbonate can be recovered by evaporation and crystallization. Cesium can be removed from the cesium delta manganese dioxide by ion exchange using aqueous solutions of acids or appropriate metal salt solution. In this way, other commercially desirable inorganic salts of cesium may be obtained.

DETAILED DESCRIPTION

The preferred starting material for the process of the present invention is pollucite ore. However, other cesium-bearing minerals can be used as starting materials, although they are of lower cesium content, such as lepidolite and carnallite.

The content of cesium in crude pollucite ore varies over a considerable range, such as from 5 to 32 weight percent $Cs_2O$. Although not required for the purpose of the present invention, the cesium content of the starting material for the hydrochloric acid extraction may be upgraded by froth flotation to separate the pollucite from non-pollucite minerals. See Kirk-Othmer, *Encyclopedia of Chemical Technology*, Vol. 5, 327-338, at 330, (3rd ed., 1979).

The theoretical structure of pure pollucite is $Cs_2O \cdot Al_2O_3 \cdot 4SiO_2$. Natural pollucite, however, contains varying amounts of rubidium, potassium, and sodium in the pollucite crystal structure, the $Cs_2O$ being replaced by $Rb_2O$, $K_2O$, or $Na_2O$. Natural pollucite also contains some iron, usually in the form of an iron oxide. Crude pollucite ore is a heterogeneous material. It is therefore a particular advantage of the process of the present invention that no upgrading of crude pollucite ore is required, and that, in fact, the preferred starting material is crude pollucite ore.

The crude pollucite ore, upgraded pollucite, or other cesium-bearing mineral is crushed and ground to a state of fine subdivision. For example, the particle size may be minus 200 mesh (American Standard Screen). It will be understood, however, that although the particle size is not critical, a fine state of subdivision is advantageous to facilitate rapid contacting of the hydrochloric acid with the cesium values to be solubilized.

The finely divided cesium-bearing starting material is subjected to a leaching-type digestion with aqueous hydrochloric (HCl) acid. For example, a glass-lined reaction vessel equipped with an agitator can be used. The amount of HCl present will be generally somewhat in excess of the minimum amount required to react with the cesium and other metals forming soluble chlorides. For example, the HCl may be present in an excess on a stoichiometric basis of from 15 to 75 mole percent. The concentration of the hydrochloric acid may vary from 10 to 30 weight percent. A preferred concentration is from about 18 to 20 weight percent. In an optimized embodiment, 20% HCl is employed, which is an azeotropic mixture, thereby permitting the reaction to be carried out under reflux at an elevated temperature promoting the extraction. At the approximate 20% HCl concentration, under boiling conditions the distillate has the same concentration as the liquid (20% HCl), so that it can be evolved, condensed, and returned to the reaction mixture while the concentration in the reaction mixture remains the same. Although this procedure is desirable, it is not critical, and, as indicated, the reaction can be carried out at concentrations substantially above and below 20%. As a variation of the procedure described, if the starting concentration is below 20% HCl, the distillate will be largely water alone, and this can be permitted to evolve without condensation until the azeotropic concentration is reached, after which reflux can be applied to return a 20% distillate.

The extraction temperatures can be selected to promote the desired extraction. For example, an elevated temperature in the range of 100°-110° C. can be used. In the preferred embodiment, where 20% HCl is used under reflux, the reaction temperature at normal atmospheric pressure will be about 107°-108° C.

The extraction is continued until substantially all of the cesium has been solubilized as cesium chloride. This may require from 1 to 8 hours, depending on the equipment and extraction conditions. During extraction, the residual silicon dioxide ($SiO_2$) from the extracted pollucite forms insoluble hydrated silicon dioxide ($SiO_2 \cdot x H_2O$). Other insoluble substances may also be present. The extract is separated from these insolubles, preferably by a decanting operation, since the silicon dioxide hydrate is difficult to filter. Centrifugation can be used as an alternate although somewhat less desirable method of separation.

The separated HCl extract will contain the cesium values in the form of cesium chloride, together with other alkali metal chlorides, particularly rubidium and potassium chloride, although some sodium chloride may also be present. The aluminum from the pollucite will also be present in solution as aluminum chloride ($AlCl_3$), and, usually, some iron will also be present as iron chloride ($FeCl_3$).

The pH of the cesium and other metal chlorides will be very low where excess HCl is present as preferred. The solution pH, such as a pH of around 1.0, should be raised to a pH at which potassium permanganate ($KMnO_4$) or other water-soluble permanganate is stable in solution, and at which cesium permanganate can be precipitated. In general, the pH should be raised to a pH of 2.5 to 3.0 or higher. This pH adjustment may be carried out so as to precipitate iron hydroxide, or both iron hydroxide and aluminum hydroxide. The upward pH adjustment may be made by addition of a hydroxide or carbonate such as sodium or potassium hydroxides or carbonates. Sodium hydroxide is a preferred reagent. The pH of the solution can also be raised by distilling off excess HCl.

In the pH adjustment step, preferably the pH is raised sufficiently to remove substantially all of the iron as iron hydroxide, $Fe(OH)_3$, and most of the aluminum as aluminum hydroxide, $Al(OH)_3$. The iron III hydroxide will precipitate more completely at a lower pH, substantially all of the iron hydroxide being formed and precipitated by an adjustment to pH 4.0, the precipitation occuring in the range from 2.2 to 4.0 whereas the aluminum hydroxide begins to precipitate at about pH 3.8 with hydroxide formation and the precipitation is substantially complete at about pH 7.6 to 8.0. It is therefore preferred to adjust the pH upwardly to a pH at least in the range of 3.8 to 8.0, such as to a pH of 7.0 to 8.0. The pH may be increased above 8.0, but at very high alkaline pH's, the aluminum hydroxide will redissolve in the form of sodium aluminum hydroxide, $NaAl(OH)_4$. However, part or all of the aluminum can remain in solution without interfering with the permanganate precipitation, since aluminum permanganate is very soluble. Moreover, if the solution contains little or no iron, a pH adjustement to 2.5 to 3.0 is sufficient, and no hydroxide precipitate need be formed or removed.

The residual solution of the alkali metal chlorides is separated from the polyvalent metal hydroxide precipitate by centrifugation or filtration. The supernatant solution at this point will contain the cesium chloride, and also the other alkali metal chlorides, particularly rubidium, potassium, and sodium chloride, the latter chloride having been increased where sodium hydroxide is used for the pH adjustment. The use of an alkali metal hydroxide for the pH adjustment, such as sodium or potassium hydroxide, does not interfere with the recovery of the cesium salt in pure form.

In the next step of the process, water-soluble permanganate salt is added to the solution of the alkali metal chlorides. Potassium permanganate ($KMnO_4$) is the preferred reagent, but other water-soluble permanganate salts can be used, such as sodium, or calcium, or barium permanganates. Potassium permanganate is usually the least expensive and most readily available of the water-soluble permanganates.

The permanganate ion reacts with the cesium ion to form highly water-insoluble cesium permanganate ($CsMnO_4$), which readily precipitates from the supernatant solution. The precipitation is selective in the presence of potassium, sodium, and aluminum ions, and other metal ions. Although most of the aluminum has preferably also been removed with the iron, any which ions remaining in the solution can be tolerated. The formation of the cesium permanganate may be carried out as a crystallization procedure, the reaction being performed in a crystallizer under conditions favoring crystal formation. The temperatures are not especially critical, and may range from about ambient room temperature (e.g. 20° C.) to 80° C. On the basis of present information, it is believed that the preferred temperature conditions are from about 40° to 70° C.

After completion of the formation of the insoluble cesium permanganate, such as by the production of cesium permanganate crystals in a suitable crystallizer apparatus, the $CsMnO_4$ solids are recovered by a suitable separation procedure such as centrifugation or filtration. The separated $CsMnO_4$ solids may be washed with water to remove residual solution and soluble material, and thereby enhance the purity of the recovered cesium permanganate.

To improve the yield of the desired cesium permanganate, the precipitate of the polyvalent metal hydroxide as obtained at an earlier point in the process, may be washed with water to remove soluble cesium chloride, and the cesium chloride-containing wash water may be combined with the supernatant solution of alkali metal chlorides before the solution is subjected to the permanganate treatment.

In one procedure, the pH of the alkali metal chloride solution remains the same as that of the supernatant as recovered from the hydroxide precipitation step, having a pH of 4.0 to 8.0. More generally a pH in the range from 3 to 12 can be used for the permanganate precipitation.

In accordance with the foregoing disclosure, the preferred process steps can be summarized as follows:

PREFERRED PROCESS STEPS (1) Ground Pollucite Ore + Aqueous HCl (excess)

$\rightarrow CsCl + SiO_2 \cdot x H_2O \downarrow + (AlCl_3, FeCl_3, RbCl, KCl)$ (2) Separate HCl Extract from Precipitate (Decanting or Centrifugation)

(3) HCl Extract + NaOH (to pH 7.6)

$\rightarrow Fe(OH)_3 \cdot xH_2O \downarrow + Al(OH_3) \cdot x H_2O \downarrow + NaCl + CsCl + (RbCl, KCl)$ (4) Separate Solution of Alkali Metal Chlorides from Precipitate (Centrifugation or Filtration)

$\rightarrow CsCl + RbCl + KCl + NaCl$ (Solution)

(5) Solution of Alkali Metal Chlorides + $KMnO_4$ $\rightarrow CsMnO_4 \downarrow + RbCl + KCl + NaCl$ (6) Recover Cesium Permanganate ($CsMnO_4$)

(Centrifugation or Filtration)

The above process steps are further illustrated by the following examples.

EXAMPLE I 375 g pollucite, (20.93% Cs, 0.82% Rb, 1.02% Na, 0.71% K, 0.04% Fe and some other minor impurities) ball-milled to a particle size of minus 200 mesh were added to 0.9 l 20% hydrochloric acid in a 2 liter, 3-neck glass round flask placed in a heating mantle. The acid was about 30% in excess of the stoichiometric quantity. The flask was equipped with thermometer, agitator and a water-cooled condenser. The reaction mixture was heated to 108° C. and reacted at this temperature (constant reflux) for 4 hours. No water was boiled off. Boiling off water and keeping the HCl concentration at 20% would have shortened the reaction time considerably. Then the agitation was stopped and after the silica settled, preferably overnight, 0.525 l of the supernatant was separated by decantation. The silica sediment was then suspended and washed in the glass round flask with 0.525 l water. The solids were again allowed to settle and this time 680 ml were separated by decantation. Remaining in the flask were now 450 g of slimy silica paste (1.81% Cs or 8.15 g Cs as chloride). This paste was removed from the flask and dried at 120° C. overnight and the weight loss was found to be 44%. The dried silica cake was suspended in 350 ml water, heated to boil, filtered through a coarse-porosity buchner-type glass funnel and the remaining cake was washed with 75 ml boiling water. The purpose for drying the slimy paste was to dehydrate the silica. It is very difficult to efficiently wash hydrated silica. After the drying, the silica cake can be washed easily and separated from liquid by filtration. The supernatant of the first and second decantation and the leachate of the silica cake were combined and added up to a volume of 1.73 l (1997 g) (43.24 g/l Cs, 1.41 g/l Rb, 2.03 g/l Na, 0.38 g/l K, 2.21 g/l Fe, 12.63 g/l Al, 0.05 g/l Mn, 0.05 g/l Ni). The extraction yield of cesium at this point was found to be 95.3% (74.8 g Cs). The pH of the 1.73 l acidic chloride solution was raised to 7.6 with 320 g 50% sodium hydroxide solution to precipitate the aluminum, iron and the other heavy metals as hydroxides. The precipitate was separated from the chloride solution by filtration and 566 g filter cake and 1.47 l (1691 grams) filtrate were obtained. The filter cake was dried at 120° C. overnight and the weight loss was found to be 70%. This dried filter cake (6.16% Cs, 0.14% Rb, 13.9% Na, 0.09% K, 0.56% Fe, 2.99% Al, 0.042% Mn, 0.018% Ni) was suspended in water, heated to boil, filtered through a coarse-porosity buchner-type glass filter funnel, washed with a little water and 0.412 l filtrate-wash were obtained containing 8.9 g cesium. This solution was combined with the 1.47 l heavy-metal-free chloride solution to obtain a total volume of 1.881 l containing 73.1 g Cs which is 93.2% of the yield. The chloride solution (38.85 g/l Cs, 1.19 g/l Rb, 35 g/l Na, 0.61 g/l K) was heated to 60° C. and 568 g of 16% $KMnO_4$ solution of 60° C. were added under agitation. It was reacted at 50° C. for 30 minutes and then cooled to room temperature. The precipitate was separated by filtration and 161 g filter cake containing 135 g $CsMnO_4$ and 2.35 l filtrate were obtained. The cake was washed with 100 ml cold water to remove the adherent solubles. Elemental analysis of the wet $CsMnO_4$ gave the values 44.59% Cs, 0.095% Rb, 0.031% Na, <0.0009% K, <0.011% Al, 0.01% Fe, 18.43% Mn, 0.02% Ca, indicating $CsMnO_4$ purity of at least 99.6%. The wet product can be dried to obtain dry $CsMnO_4$ crystals or used to make other cesium compounds. Purity assay of the dried $CsMnO_4$ crystals indicated a purity of 99.9% ±0.1%.

EXAMPLE II

The supernatant of the first and second decantation and the leachate of the silica cake as obtained in Example I, 44.0 g/l Cs, 1.43 g/l Rb, 2.30 g/l Na, 0.91 g/l K, 0.66 g/l Fe, 14.80 g/l Al, 0.034 g/l Mn, 0.005 g/l Ni), were subjected to an alternate process. The pH of the 1.50 liter acidic chloride solution was raised to 4.0 by gradually adding 314 g 20% sodium hydroxide solution to precipitate iron hydroxide and a little aluminum hydroxide. The hydroxide precipitate was separated from the chloride solution by filtration and 51 g filter cake and 1.734 l filtrate was obtained. This solution (37.30 g/l Cs, 1.21 g/l Rb, 23 g/l Na, 0.77 g/l K, 13 g/l Al) was heated to 60° C. and 500 g of 16% $KMnO_4$ solution at 60° C. were added under agitation. It was reacted at 50° C. for 30 minutes and then cooled to room temperature. The precipitate was separated by filtration and 142 g filter cake containing 120 g $CsMnO_4$ and 2.35 l filtrate were obtained. 120 g $CsMnO_4$ corresponds to a 96% cesium recovery from the chloride solution. The cake was washed with 100 ml cold water to remove the adherent solubles. Elemental analysis of the wet $CsMnO_4$ gave the values 44.07% Cs, 0.034% Rb, 0.004% Na, <0.0009% K, <0.016% Al, 0.004% Fe, 18.22% Mn, indicating $CsMnO_4$ purity of at least 99.6%. The wet product was dried to obtain dry $CsMnO_4$ crystals. Purity assay of the dried $CsMnO_4$ crystals indicated a purity of 99.9% ±0.1%.

FURTHER PROCESSING STEPS

The cesium permanganate prepared as described may be sold as a commercial product, or it may be further processed to prepare other commercially desirable cesium compounds. Such further processing involves an initial key reaction in which the cesium permanganate is reacted with a permanganate reducing agent. The products of the reduction is cesium carbonate, which is a commercial product, and also cesium delta manganese dioxide, from which cesium can be recovered. In preferred embodiments, therefore, such further processing is a desirable part of the present invention, and will now be described in further detail.

Cesium permanganate can function as a solid-phase oxidizing agent, and can be reacted with virtually any oxidizable compound. The oxidizable compounds function as reducing agents, and may be reacted in liquid, gaseous, or solid-phase reactions, such reducing agents include compounds containing carbon, hydrogen, or both carbon and hydrogen, which are oxidized to carbon dioxide and/or water by permanganate. While the reducing agent may be in the form of a gas, such as carbon monoxide, or hydrogen gas, a presently preferred procedure is to use a water-soluble reducing agent, and to dissolve the reducing agent in an aqueous alkaline solution for contacting with the solid-phase cesium permanganate. Such water-soluble reducing agents include, for example, starches, sugars, methanol, formic acid, or formaldehyde.

Using an aqueous slurry, the solid particles of the cesium permanganate can be dispersed in water containing the dissolved reducing agent. The pH of the aqueous phase can range from 4 to 12, but a moderately alkaline pH is preferred, such as pH 8.0 to 10.0. The temperature of the reduction is not highly critical, but may range, for example, from 20° to 100° C. The presently preferred temperature is from about 60° to 80° C.

The reduction reaction using methanol as the reducing agent and an aqueous alkaline solution can be represented by the following equation.

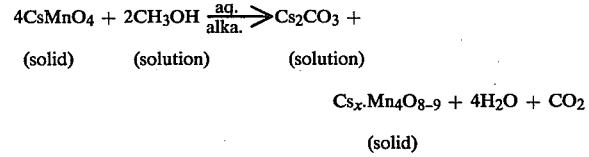

$$Cs_x.Mn_4O_{8-9} + 4H_2O + CO_2$$
(solid)

In the above equation, the cesium delta manganese dioxide product is represented by a generalized formula. The cesium content represented by the letter "x" may vary from 0.8 to 2 moles per each 4 moles of manganese, and the oxygen content may correspondingly vary from 8 to 9 moles of oxygen. To maximize the amount of cesium carbonate obtained and to minimize the amount of cesium associated with the manganese dioxide is a desirable objective. However, the cesium can be recovered from the delta manganese dioxide by treating this product with acids or metal salt solution to replace the cesium in an ion-exchange-type reaction. By employing a reaction pH of from 4 to 7, and a temperature of from about 20° to 90° C., delta manganese dioxide can be obtained containing less than 1 mole of cesium per each 4 moles of manganese.

The aqueous solution of the cesium carbonate is separated from the reaction solids, comprising the cesium delta manganese dioxide, by centrifugation or filtration. Thereafter, the cesium carbonate can be recovered in solid form by evaporation and crystallization procedures.

The remaining cesium associated with the manganese dioxide may be recovered by treating the delta manganese dioxide with an acid or polyvalent metal salt solution. The acid or polyvalent metal salt solution may be selected so that the anion will form a desired salt with the cesium, such as sulfuric acid or manganese sulfate to obtain cesium sulfate, hydrochloric acid or manganese chloride to obtain cesium chloride, nitric acid or manganese nitrate to obtain cesium nitrate. These reactions are represented by the following equations (A) and (B) in which a delta manganese dioxide containing 2 moles of cesium per 4 moles of manganese is reacted with sulfuric acid or manganese sulfate to obtain cesium sulfate as the product.

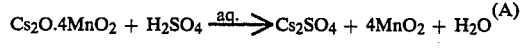

(solid)       (solid)

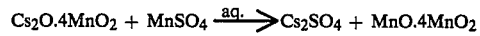

(solid)       (solid)

The reactions represented by the above equations are preferably carried out at temperatures of from about 20° to 50° C., but in certain embodiments temperatures up to 80° C. can be used. In the reaction of equation (A), since the acid is the reactant, the reaction will be carried out at an acid pH, usually a strong acid pH in the range from about 1 to 3. However, the reaction will proceed at any acid pH below 7.0. The reaction of equation (B) will also be at an acid pH below 7.0. The resulting manganate product will be in an acid form, which may be represented as: $MnO_2 \cdot xH_2O$.

In general, any strong acid can be used in the reaction of equation (A), including in addition to sulfuric acid, the other mineral acids (viz. nitric, hydrochloric, etc.). Any water-soluble polyvalent metal salt of a strong mineral acid can be substituted for the $MnSO_4$, such as cobalt, copper or nickel sulfate, nitrate, or chloride. Equations (A) and (B) can be used as a reaction sequence where not all of the cesium is recovered by reaction (A). It is believed to be preferred, however, to employ only reaction (B), which can result when used without reaction (A) in a substantially complete recovery of the cesium.

The cesium sulfate solution as obtained in reactions (A) and (B) can be separated from the manganese dioxide solids by centrifugation or filtration. The cesium sulfate or other cesium salt can then be recovered by evaporation and crystallization procedures.

In an alternative process embodiment, the $CsMnO_4$ can be reduced with a solid or gaseous reductant, and the $Cs_2CO_3$ leached from the converted solids by aqueous extraction, leaving the cesium delta manganese dioxide as the residue, which can be further processed as described above.

Further processing of cesium delta manganese dioxide is illustrated by the following examples.

EXAMPLE III 100 g $CsMnO_4$ (52.40% Cs, 21.66% Mn, 0.13% K, 0.07% Rb, 0.056% Al, 0.035% Na, 0.001% Fe) as prepared by the process of example I or II was suspended in 400 ml $H_2O$ in a 1 liter beaker. The suspension was stirred and its pH adjusted to 13 with 6.9 g CsOH in 14 ml water. It was heated to 60° C. and 12.7 g $CH_3OH$ in 12.7 ml water were gradually added within 45 minutes. The reaction mixture was stirred and kept at 60° C. for another 10 min. or until all seven-valent manganese was reduced to four-valent manganese. If the reduction of the $CsMnO_4$ is carried out at room temperature, the reduction process will be extended. The solids were separated from the liquid by filtration through a medium-porosity buchner filter funnel, it was washed with 50 ml water and 146 grams filter cake (17.9% Cs, 14.85% Mn, 0.58% Rb) and 360 ml filtrate and wash (65.6 g/l Cs, 0.06 g/l Rb, 0.05 g/l K, 0.002 g/l Na, 0.0006 g/l Mn) were obtained. The cesium extraction from the $CsMnO_4$ is at this point 50% and the molar ratio Mn:Cs in the filter cake is 1:0.5.

The $Cs_2CO_3$ in the filtrate can be recovered as such or be converted into any suitable cesium compound by addition of the corresponding acid followed by evaporation and crystallization.

The 146 g filter cake were suspended in 200 ml water and pH-adjusted to 0.6 with 27.3 g 50% $H_2SO_4$. The reaction mixture was stirred for several hours then filtered through a medium-porosity filter funnel. It was washed with 100 ml water and 106 g filter cake (20.4% Mn, 5.92% Cs), and 350 ml filtrate containing 73 g/l $Cs_2SO_4$ were obtained, which is another 38% cesium extraction. The total extraction of cesium from the $CsMnO_4$ was 88% leaving 12% in the $MnO_2$. Higher acid concentration did not improve the extraction yields significantly. The filtrate was pH-adjusted to 7 with a solution containing 79.7 g/l $Cs_2CO_3$. Any soluble two-valent manganese left was oxidized with a suitable oxidant ($CsMnO_4$, etc.), precipitated as manganese oxide and removed by filtration. The filtrate was evaporated to dryness. The $Cs_2SO_4$ obtained was 99.4% pure.

EXAMPLE IV 100 g $CsMnO_4$ (99.4% $CsMnO_4$, 21.68% Mn, 52.46% Cs) as prepared by the process of Example I or II were suspended in 400 ml $H_2O$ in a liter beaker. The suspension was stirred and heated to 65° C. and 12.7 g $CH_3OH$ in 12.7 ml water were gradually added within 45 minutes. The reaction mixture was stirred and kept at 60° C. for another 3 hours or until all seven-valent manganese is reduced to four-valent manganese. (Due to the open beaker some water evaporates.) If the reaction is carried out at room temperature the reduction process will be extended. The solids were separated from the liquid by filtration through a medium-porosity buchner filter funnel, it was washed with 100 ml water and 110 g filter cake (15.31% Cs, 0.08% Rb, 0.033% Na, 0.032% K, 0.016% Fe, 19.85% Mn) and 460 ml filtrate and wash (77.54 g/l Cs, 0.23 g/l Rb, 0.0014 g/l Na, 0.043 g/l K, 0.0005 g/l Mn) were obtained. The cesium extraction from the $CsMnO_4$ is at this point 68% and the molar ratio Mn:Cs in the filter cake is 1:0.32.

The $Cs_2CO_3$ in the filtrate can be recovered as such or be converted into any suitable cesium compound by addition of the corresponding acid followed by evaporation and crystallization.

The 110 g filter cake were suspended in 220 ml of a solution containing 68.2 g/l $MnSO_4$. The reaction mixture was stirred and heated and kept at 50° C. for 10 hours. It was filtered through a medium-porosity buchner filter funnel, washed with 100 ml water and 155 g filter cake (17.6% Mn, 0.17% Cs) and 260 ml filtrate and wash (63.7 g/l Cs, 0.24 g/l Rb, 0.03 g/l Na, 0.032 g/l K) were obtained.

Any soluble two-valent manganese left was oxidized with a suitable oxidant ($CsMnO_4$, etc.), precipitated as manganese oxide and removed by filtration. Other manganese salts can be used in this ion exchange reaction such as $MnCl_2$, $MnNO_3$, $MnCO_3$, etc. to obtain the cesium salt needed. The filtrate was evaporated to dryness and 22.7 g $Cs_2SO_4$ (72.87% Cs, 0.11% Rb, 0.008% K, 0.0006% Na) were obtained. The extraction of cesium from the CsMnO$_4$ was 68% as Cs$_2$CO$_3$ and 31.5% as Cs$_2$SO$_4$ which totals 99.5%. The purity of the product is higher than 99.7%.

In the recovery of cesium from the cesium containing delta MnO$_2$, any compounds known to ion exchange alkali in alkali-containing delta MnO$_2$'s can be used. As for example compounds of zinc, calcium, barium, copper, cobalt, nickel, etc. being polyvalent metal salts of strong mineral acids.

I claim:

1. A process for recovering cesium from a cesium-bearing mineral wherein the finely-divided mineral is extracted with aqueous hydrochloric acid (HCl) to obtain an aqueous acidic extract containing in solution cesium chloride (CsCl) together with rubidium chloride (RbCl), aluminum chloride (AlCl$_3$) and other metal chlorides selected from the group consisting of potassium chloride (KCl), sodium chloride (NaCl), iron chloride (FeCl$_3$), or mixtures thereof, wherein the improvement comprises
   (a) increasing the pH of said aqueous acidic extract to a pH of 2.5 to 3.0 or higher;
   (b) separating any precipitated metal hydroxide from the aqueous solution of CsCl;
   (c) adding a water-soluble permanganate to said aqueous solution and selectively precipitating cesium permanganate (CsMnO$_4$) in the presence of other metal chlorides; and
   (d) separating the precipitate from the residual solution to obtain CsMnO$_4$ of high purity.

2. The process of claim 1 wherein said cesium-bearing mineral is pollucite.

3. The process of claim 1 wherein said water-soluble permanganate is potassium permanganate (KMnO$_4$).

4. The process of claim 1 in which the separated CsMnO$_4$ precipitate is reacted with a permanganate reducing agent to obtain cesium carbonate (Cs$_2$CO$_3$) and cesium delta manganese dioxide (Cs$_x$Mn$_4$O$_{8-9}$ wherein x=0.8 to 2).

5. In a process for recovering cesium from pollucite mineral wherein the finely divided mineral is extracted with hydrochloric acid (HCl) to obtain an aqueous acidic extract containing in solution cesium chloride (CsCl) together with the chlorides of rubidium, potassium, aluminum, and iron, said solution having been separated from the hydrated silicon dioxide precipitate formed in the extraction, wherein the improvement comprises:
   (a) treating the said aqueous acidic extract by adjusting its pH upwardly to a pH from 4.0 to 8.0 to precipitate polyvalent metal hydroxide;
   (b) separating the precipitated metal hydroxide to obtain an aqueous solution of CsCl together with other alkali metal chlorides;
   (c) adding potassium permanganate (KMnO$_4$) to said aqueous solution to selectively precipitate cesium permanganate (CsMnO$_4$); and
   (d) separating the precipitate from the residual solution of the other alkali metal chlorides to obtain CsMnO$_4$ of high purity.

6. The process of claim 5 in which in step (a) the pH is raised to a pH of at least 7.0 to 8.0 to precipitate both aluminum and the iron as their hydroxides.

7. The process of claim 5 in which in step (a) said pH is adjusted upwardly by adding an alkali metal hydroxide other than cesium hydroxide to said aqueous solution.

8. The process of claim 5 in which in step (a) said pH is raised to a pH of at least 7.0 to 8.0 by adding sodium hydroxide to said aqueous solution to substantially completely precipitate both the aluminum and the iron as their hydroxides.

9. The process of claim 5 in which said pollucite mineral from which said extract is prepared is a crude pollucite ore.

10. The process of claim 5 in which the separated CsMnO$_4$ precipitate is reacted with a permanganate reducing agent to obtain cesium carbonate and cesium delta manganese dioxide.

11. A process for recovering cesium from pollucite mineral wherein the finely divided mineral is extracted with aqueous hydrochloric acid (HCl) to obtain an aqueous acidic extract containing in solution cesium chloride (CsCl) together with rubidium chloride (RbCl), aluminum chloride (AlCl$_3$) and other alkali chlorides selected from the group consisting of potassium chloride (KCl), sodium chloride (NaCl), iron chloride (FeCl$_3$), or mixtures thereof, wherein the improvement comprises:
   (a) increasing the pH of said aqueous acidic extract to a pH of 2.5 to 3.0 or higher;
   (b) separating any precipitated metal hydroxide from the aqueous solution of CsCl;
   (c) adding a water-soluble permanganate to said aqueous solution and selectively precipitating cesium permanganate (CsMnO$_4$) in the presence of other metal chlorides;
   (d) separating the precipitate from the residual solution to obtain CsMnO$_4$ of high purity;
   (e) forming a slurry of the separated CsMnO$_4$ in an aqueous alkaline solution containing a permanganate reducing agent;
   (f) reacting the CsMnO$_4$ with said reducing agent to obtain cesium carbonate (Cs$_2$CO$_3$) in solution and solid phase cesium delta manganese dioxide (Cs$_x$.Mn$_4$O$_{8-9}$ wherein x=0.8 to 2); and
   (g) separating the cesium carbonate solution from the cesium delta manganese dioxide.

12. The process of claim 11 wherein said water-soluble permanganate is potassium permanganate (KMnO$_4$).

13. The process of claim 11 in which said reducing agent is methanol.

14. The process of claim 11 in which said solution during said reducing reaction has a pH of from 4 to 7 to obtain Cs$_x$.Mn$_4$O$_{8-9}$ wherein x has an average value of less than 1.

15. The process of claim 11 in which the separated cesium delta manganese dioxide is reacted with an aqueous solution of a strong mineral acid to exchange the cesium for the hydrogen and obtain an aqueous solution of a cesium salt of the strong mineral acid.

16. The process of claim 11 in which the separated cesium delta manganese dioxide is reacted with an aqueous solution of a polyvalent metal salt of a strong mineral acid to exchange the polyvalent metal for the cesium and obtain an aqueous solution of the cesium.

* * * * *